United States Patent Office 2,801,118
Patented July 30, 1957

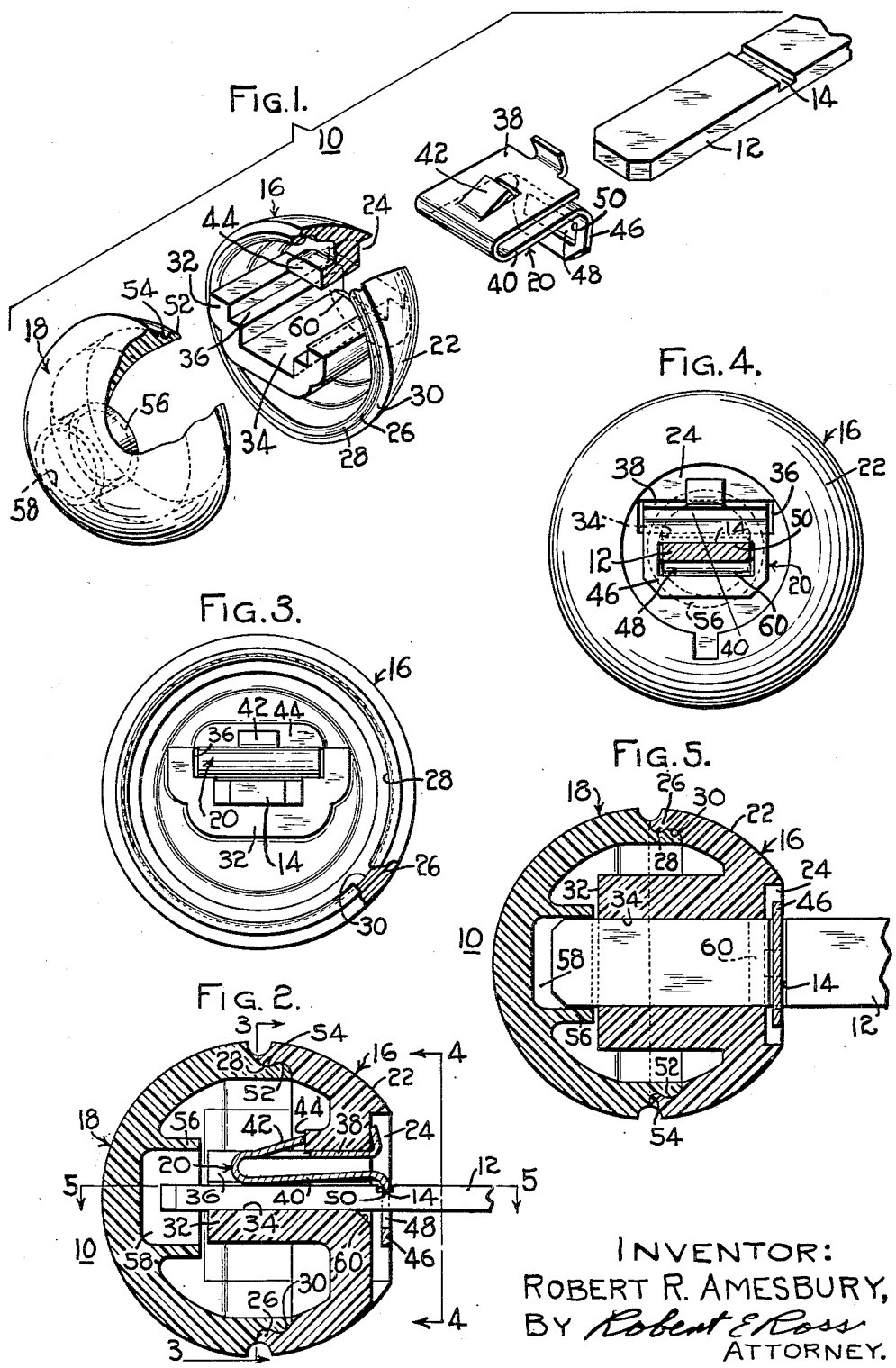

2,801,118

KNOB ASSEMBLY

Robert R. Amesbury, Wellesley, Mass., assignor, by mesne assignments, to United-Carr Fastener Corporation, Boston, Mass., a corporation of Delaware Application December 4, 1953, Serial No. 396,124

4 Claims. (Cl. 287—53)

This invention relates generally to knobs for assembly onto the end of a shaft.

In the manufacture of automobiles and the like, certain control shafts extending to the dash-board must be provided with knobs for operating the shafts, usually by a push-pull action. Such knobs are required to be non-rotatable, must hold securely on the shaft, and must be readily removable. It is also important that the knobs be economical to manufacture and easy to assemble.

The object of the invention is to provide an improved knob fastener for assembly onto the end of a shaft so as to be readily removable.

A further object of the invention is to provide a knob assembly in which a knob body portion open at one end is provided with an aperture in the other end and internal colateral channel means for receiving a shaft and a fastener for engaging the shaft.

Other objects of the invention will in part, be obvious, and will in part, appear hereinafter.

In the drawing:

Fig. 1 is an exploded view in perspective of a knob assembly embodying the features of the invention;

Fig. 2 is a view in section of the assembled knob with a shaft assembled therein;

Fig. 3 is a view in section taken on line 3—3 of Fig. 2;

Fig. 4 is a view in section taken on line 4—4 of Fig. 2; and

Fig. 5 is a view in section taken on line 5—5 of Fig. 2.

Referring to the drawing, there is illustrated a knob assembly 10, which is adapted for assembly onto the end of a shaft 12 which is rectangular in cross section and has a transverse slot 14 spaced from the end.

The knob assembly 10 comprises generally a first body portion 16, a second body portion 18, and a fastening device 20 assembled with the first body portion.

The first body portion 16 is preferably formed of molded plastic, and comprises a peripheral wall 22 generally hemispherical in shape, with an aperture 24 in the rear end with the other or front end being open and terminating in an edge portion 26 having an inwardly protruding shoulder 28 with a peripheral recess 30 disposed behind the shoulder 28.

To provide means for attaching the knob to a shaft, a shaft receiving portion 32 extends from the aperture 24 toward the front end of the body portion 16, and is provided with a lower channel 34 conforming generally to the shape of the shaft end, and an adjoining upper wider channel 36 for receiving the fastener 20.

The fastener 20 is formed of a single piece of sheet metal and is generally U-shaped with legs 38 and 40 extending toward the aperture 24. The upper leg 38 is provided with a projecting tongue 42 which bears against a stop or abutment 44 disposed above the channel 36 to retain the fastener in the body, and the lower leg 40 of the fastener has an end portion 46 extending downwardly across the entrance to the lower channel 34. The end portion 46 is provided with an aperture 48 to receive the shaft, and the upper edge 50 of the aperture is substantially straight to snap into engagement with the transverse slot 14 in the shaft, as will be more fully described hereinafter.

The second body portion 18 is substantially hemispherical in shape and has a peripheral wall portion with an edge having a projecting shoulder 52 with a peripheral recess 54 disposed behind the shoulder. The shoulder and recess 52 and 54 are so related in size to the shoulder and recess 28 and 30 in the first body portion as to permit the two body portions to be snapped into engagement, as illustrated in Fig. 2.

The second body portion 18 is substantially hollow, and has an internal cylindrical projection 56, forming a cavity 58 which is aligned with the shaft receiving channel 34 in the first body portion, so that when the knob is assembled onto the shaft, the end of the shaft enters the recess 58.

To assemble the device, the body portions are snapped together, and the fastener 20 is assembled into the upper channel so that the tongue 42 snaps behind the stop 44, with the end portion 46 extending over the entrance to the lower channel 34. The legs 38 and 40 of the fastener are so disposed that they are flexed together when the fastener is assembled, and the upper edge 50 of the fastener is so disposed that the lower leg 40 must be flexed upwardly when the knob is assembled onto the shaft to permit the shaft to pass into the lower channel. Hence to facilitate entrance of the shaft the lower edge of the lower channel is provided with an inclined surface 60 at the entrance thereto to force the shaft and lower leg 40 upwardly.

As the knob is pushed further onto the shaft, the end of the shaft enters the recess 58 in the second body portion 18 and the upper edge 50 of the aperture 48 on the lower arm of the fastener snaps into the transverse slot 14, thereby retaining the knob on the shaft.

The knob may thereafter be released from the shaft by either unsnapping the second body portion and releasing the tongue 42 from the stop 44, or by lifting the end portion 46 of the lower leg so that the edge 50 is released from the transverse slot 14.

The knob is particularly adapted for rapid and economical assembly and retains itself securely on the shaft against both push-pull and rotative forces yet is easily removed.

Since certain obvious changes may be made in the illustrated device without departing from the scope of the invention, it is intended that all matter contained herein be interpreted in an illustrative and not in a limiting sense.

I claim:

1. A knob fastener for assembly onto a shaft, comprising a first knob body portion having an aperture in the rear side for receiving a shaft, a channel-shaped member extending forwardly from the aperture, a forwardly facing abutment adjacent the channel-shaped member, and a fastening device assembled onto the channel to engage the inserted shaft, said fastening device having a resilient tongue extending rearwardly against the abutment, said first knob body portion having a forwardly extending peripheral wall portion disposed about the channel-shaped member in spaced relation thereto, and a second knob body portion assembled onto the first knob body portion to enclose said channel-shaped member.

2. A knob fastener for assembly onto the end of a shaft, comprising a first knob body portion open at the front end and having an aperture in the rear end for receiving a shaft, a channel-shaped portion extending from the aperture toward the front end of the body, and a forwardly facing abutment adjacent the channel-shaped portion, a fastening device assembled onto the channel-shaped portion, said fastening device having means at the rear of the body extending transversely across the aperture to engage the inserted shaft and resilient tongue means extending rearwardly against the abutment, said first knob body portion having a forwardly extending peripheral wall disposed about said channel-shaped portion in spaced relation thereto, and a second knob body portion assembled onto the open end of the first knob body portion and enclosing said channel-shaped portion.

3. A knob fastener for assembly onto the end of a shaft, comprising a first knob body portion open at the front end and having an aperture in the rear end for receiving the shaft end, a shaft-receiving portion extending from the aperture toward the front end, said shaft-receiving portion having a shaft channel, a second channel colateral thereto, and a forwardly facing abutment adjacent the second channel, a fastening device assembled in the second channel, said fastening device having means extending across the entrance to the first channel at the rear of the body in position for engaging the inserted shaft and resilient tongue means extending rearwardly against the abutment, said first knob body portion having a forwardly extending peripheral wall disposed about said shaft-receiving portion in spaced relation thereto, and a second knob body portion assembled onto the front end of the first knob body portion and enclosing said channel-shaped portion.

4. A knob fastener for assembly onto the end of a shaft having a transverse slot, comprising a first knob body portion open at the front end and having an aperture in the rear end for receiving the shaft end, a shaft-receiving portion extending from the aperture toward the front end, said shaft-receiving portion having a first channel conforming generally to the shape of the shaft end, a second channel adjacent thereto wider than the first channel, and a forwardly facing abutment above said wider channel, a shaft-engaging fastener assembled into the second channel, said fastener having a U-shaped body portion disposed in the second channel, a resilient tongue extending rearwardly against the abutment, and an end portion extending across the entrance to the first channel of the rear of the body, said end portion having an aperture for receiving the shaft end, an edge portion of the aperture in the end portion being positioned to snap into engagement with the transverse shaft slot, and a second knob body portion assembled onto the front end of the first knob body portion, and having an internal recess therein aligned with the shaft-receiving channel to receive the end of the shaft.

References Cited in the file of this patent
UNITED STATES PATENTS

| | | |
|---|---|---|
| 1,626,671 | Enberg | May 3, 1927 |
| 2,225,594 | Murphy | Dec. 17, 1940 |
| 2,295,444 | Woodward | Sept. 8, 1942 |
| 2,643,903 | Nathan | June 30, 1953 |